Figure 1:
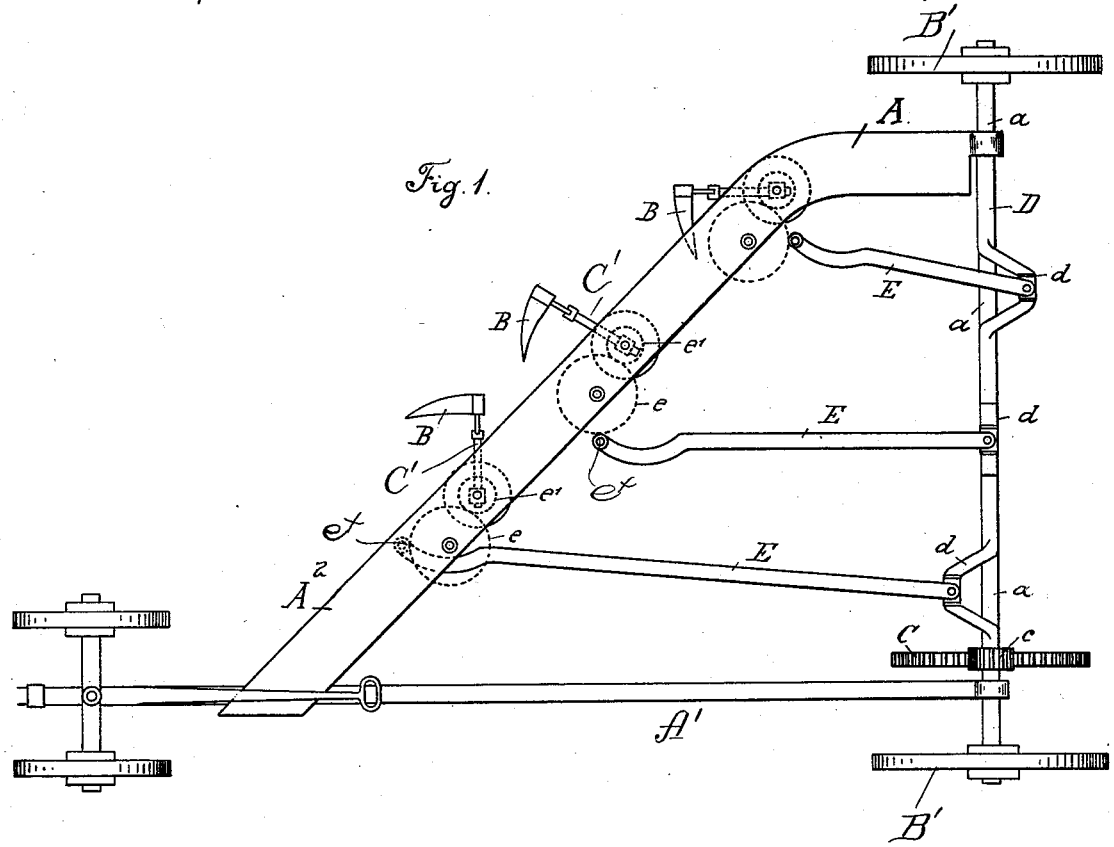

(No Model.) 2 Sheets—Sheet 1.

L. JANKOWSKI.
REAPING MACHINE.

No. 508,945. Patented Nov. 21, 1893.

Witnesses:
E. K. Sturtevant.
A. R. Dunne.

Inventor:
Ludwig Jankowski,
by Renards &c.
attorneys

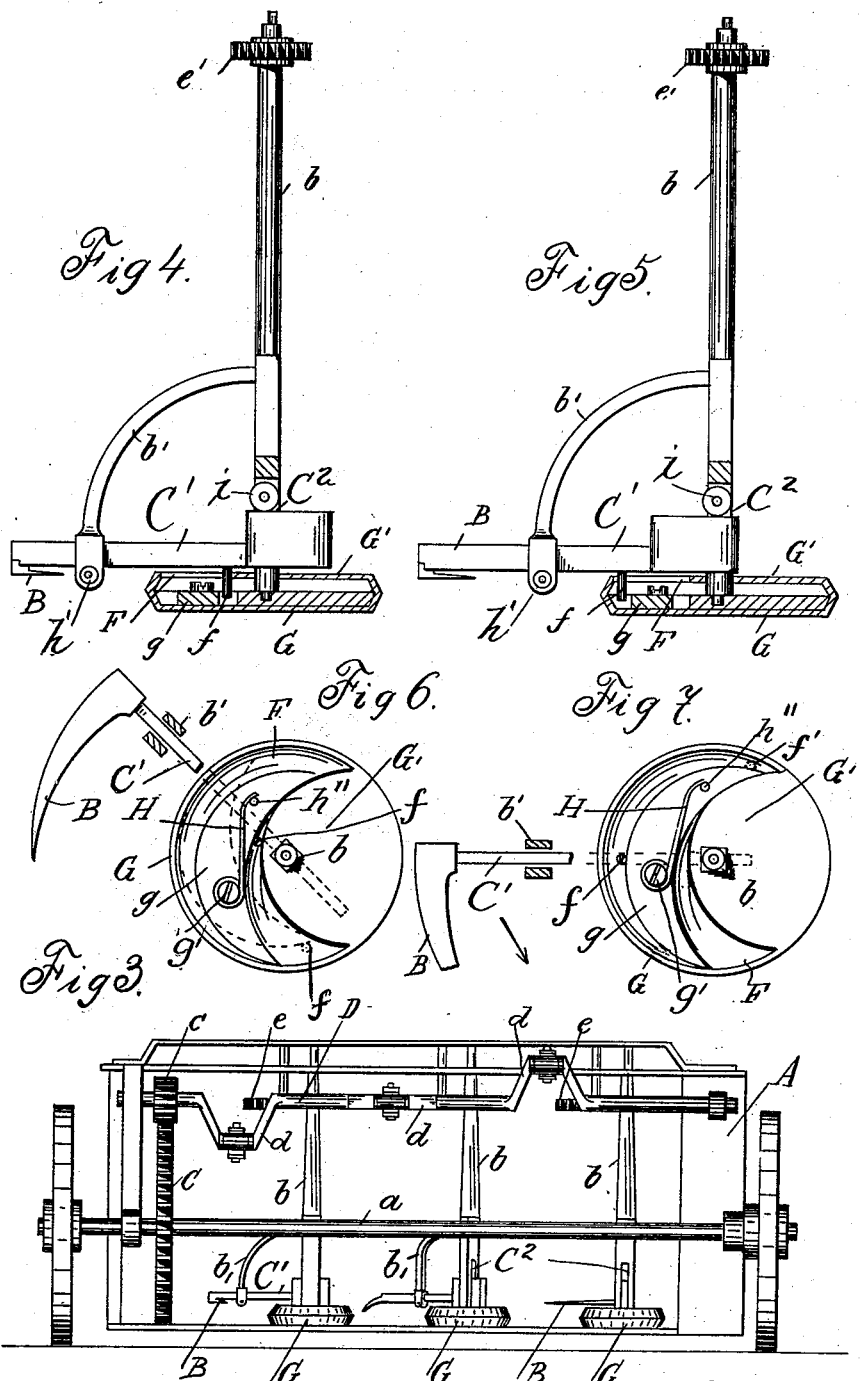

UNITED STATES PATENT OFFICE.

LUDWIG JANKOWSKI, OF MELNO, GERMANY.

REAPING-MACHINE.

SPECIFICATION forming part of Letters Patent No. 508,945, dated November 21, 1893.

Application filed December 29, 1892. Serial No. 456,713. (No model.) Patented in Germany July 30, 1891, No. 63,397, and in England August 12, 1892, No. 12,900.

*To all whom it may concern:*

Be it known that I, LUDWIG JANKOWSKI, a subject of the King of Prussia, residing at the village of Melno, Prussia, Germany, have invented certain new and useful Improvements in Reaping-Machines, of which the following is a specification.

The invention has been patented in Germany, No. 63,397, dated July 30, 1891, and in Great Britain, No. 12,900, dated August 12, 1892.

This invention relates to a machine for mowing or reaping corn and it has for its object to cut the corn by means of several scythes which are placed side by side and are made to perform a semi circular cutting movement as the machine travels along. After each cutting movement, the scythes are swung or drawn back, in such a manner that they do not touch the standing corn.

The frame of the machine consists of three parts arranged in the form preferably, of a right-angled triangle, the scythes of which there may be any desired number, being fitted on the oblique bar forming the hypotenuse of the triangle. As the machine travels along, the scythes are operated by means of a cog wheel, which is carried on the axle of the back wheels, and which gears with a pinion on a crank shaft, which is carried in bearings on the frame. Connecting rods extend from the cranks to the gearing which actuates the scythes. The connecting rods, by means of the gearing, give the scythes a fast, reciprocating or swinging motion. The scythes are preferably so arranged relatively with each other that, when one scythe is at the commencement of its cut, the second has finished half its cut, and the third has completed its cut. This arrangement gives the same effect as one continuous cut. To prevent the scythes at their backward movements, striking the standing corn, and to enable them to cut the corn evenly, they are so operated, by means of a "cam groove and pin" action, or its equivalent, that a combined circular and backward or radial movement is given to them so that they clear the corn. The cam for each scythe may be formed of two disks so fitted together, as to give a crescent or sickle shaped groove, along which the pin on the arm of the scythe travels, and draws the scythe backward. By this arrangement, at each cutting stroke of the scythes, they are thrust outward and are also caused to perform a circular mowing action, while, at the return or back stroke they are drawn inward toward their center of motion.

This machine is similar in its action to hand mowing, and, as the scythes work simultaneously and continuously, so long as the machine is drawn forward, the effect is similar to that of a line of mowers.

In order that my said invention may be properly understood, reference is made to the accompanying drawings, in which—

Figure 2:
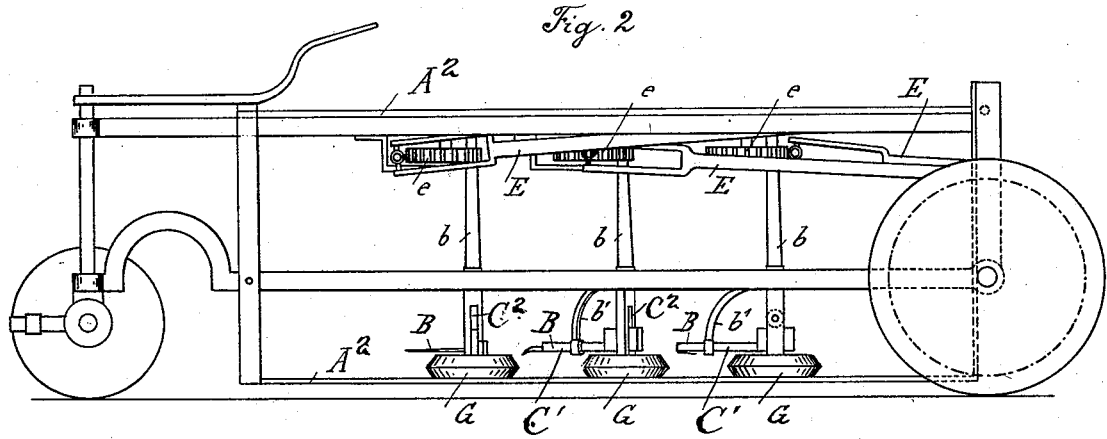

Figure 1, is a plan view of the machine. Fig. 2, is a side elevation of the machine. Fig. 3, is a back end elevation of the machine. Figs. 4, 5, 6 and 7 are detail views on an enlarged scale of the scythe carrying arms and the operating cams therefor.

Referring to the drawings, wherein the same reference letters and numeral whenever repeated indicate similar or like parts, the frame of the machine consists of three parts A, A', A², arranged together with the axle in the form preferably of a right angled triangle as shown at Fig. 1. The parts A, A' are connected together by the oblique bar A². The scythes B, of which there may be any desired number, are fitted in connection with the bar A². As the machine travels along the scythes B, are actuated by means of a cog wheel C, which is fitted on the axle $a$, of the two back wheels B', B', of the machine. The cog wheel C, gears with a pinion $c$, carried on a crank axle or shaft D, which is carried in bearings on the frame. Connecting rods E, extend from the cranks $d$, of the crank axle D, to the gearing which actuates the scythes. The connecting rods E, are forked at their ends as shown at Fig. 2 and are connected with the gear wheels $e$, carried on short spindles journaled in the bar A². The wheels $e$, gear with pinion wheels $e'$ fitted at the upper ends of vertical axles $b$, carried in the upper and lower bars A² (see Fig. 2). The scythes are fitted at the ends of shafts or arms C' which pass through guide brackets $b'$, secured to the axle $b$, and also through slots C², made in said axle $b$. The guide brackets $b'$ are forked at their lower ends and have friction rollers $h'$ in them on which the arms $C'$ rest. The slots $C^2$ have also rollers $i$, fitted in them. The connecting rods E, by means of the gearing $e$, $e'$, actuate the axles $b$, and thereby give the scythes a fast reciprocating or swinging motion. The length of the cranks $d$, is such in relation to the diameter of the gears 3, and the links E are attached to the gears at such points, that the pins $e^x$ are thrown around into or past the dead center of the gears and thus the gears are reciprocated instead of rotated.

The scythes B, are preferably arranged relatively to each other, that, when one scythe is at the commencement of its cut, the second scythe has completed half its cut, and the third has completed its cut. This arrangement gives the same effect as one continuous cut.

To prevent the scythes at their backward movement striking the standing corn, and to enable them to cut the corn evenly, they are caused to perform a combined circular backward or radial movement, so as to clear the corn. To effect this, the shafts $C'$, of the scythes are pushed in and out radially by means of pins $f$, fitted on the shafts or arms $C'$. The pin of each arm projects through a curved shaped slot F (see plan view Figs. 6 and 7) made in the disk casing $G'$, which forms the base or support of the axle $b$. In each disk casing $G'$ is a fixed semi-circular disk G (see also vertical sections Figs. 4 and 5) and also a pivoted crescent-shaped cam $g$, having near one end a pin or peg $h''$ against which rests a plate spring H, secured on the pivot $g'$. This spring has a tendency to hold the crescent shaped cam in the position shown at Fig. 7. Now supposing the scythe B (Figs. 6 and 7) has finished half its cut and is in the position shown at Fig. 7, it will be seen that its pin $f$, is in the outer space or groove left between the crescent shaped cam $g$, and the edge of the casing $G'$ and that said cam, at its upper end is pressed by the spring H, close against the cam disk G, while at the lower end, the cam is moved away from the disk and bears against the periphery of the casing $G'$. As the scythe B, is swung around, in the direction of the arrow, the pin $f$, traverses the outer groove and when near the end of its stroke it presses back the cam into the position shown in dotted lines at Fig. 6. The pin when at the end of the stroke passes around the lower point of the cam $g$, and bears against the disk G. Immediately the pin $f$, clears the lower end of the cam G, the latter is forced by the action of the spring into the position shown in full lines at Fig. 6, so preventing the return of the pin by the same way at the back stroke of the scythe. The scythe has now completed its forward cutting movement and is caused to return in a backward sweep by the reversed action of the toothed wheels $e$, $e'$ driven from the connecting rods E. As the scythe swings backward, its arm $C'$ is gradually drawn inwardly by the action of the pin $f$, which now presses against the inner edge of the cam $g$, until the pin attains the position shown in full lines at $f$, Fig. 6, when the shaft will be drawn in to its full extent, as the pin will then be in its nearest position to its center of movement namely, the axle $b$. After the pin $f$, in the backward movement of the scythes passes by the position shown in full lines at $f$, Fig. 6, the shaft $C'$, will be gradually thrust out again, as the pin travels along the curved surface of the disk G, until it reaches the point, representing the full outward position which is just clear of the upper and tapered end of the crescent-shaped cam $g$. As soon as the pin $f$, clears the upper point of the cam, the cam is at once forced, by the action of the spring H, against the semi-disk $G'$ so that it assumes the position shown in Fig. 7. When the pin reaches the point shown in dotted lines at $f'$, the scythe is ready for a second forward cutting movement, and as the cam $g$, is closed tight against the semi-disk G, the pin $f$, will be forced to travel along the outer edge of the cam $g$, in the same manner as at the previous stroke. The amount of radial or backward and forward action of the arm $C'$ and scythe, depends on the breadth at its widest part, of the cam $g$. The rollers $h'$ and $i$ enable the scythe and shaft $C'$ to be easily traveled or forced in and out.

As all the scythes operate in a similar manner to the one hereinbefore described, their combined effect is similar to that of a line of mowers.

Fig. 6, shows one of the scythes in the inward or back portion while Fig. 7, shows the same scythe in the outward or cutting position. It will be noticed that, in the one case (Fig. 4), the pin $f$, is shown as traversing the space between the cam $g$, and semi-disk G, while in the other case (Fig. 5), the pin $f$, is shown as traversing the outer space between the cam $g$, and casing $G'$.

I claim—

1. In a mowing machine the right angular frame work comprising the crank shaft D, the series of scythes arranged along the inclined bar of the frame, whereby one is in advance of the other, and the connections from crank shaft to the scythes arranged to operate them on their cutting strokes in succession, substantially as described.

2. In a mowing machine, the frame work, a scythe carried on a sliding arm, the means for giving the same a rotary reciprocating movement and the cam device adapted to give said arm a radial reciprocating movement, said cam device being arranged adjacent to the path of movement of the arm to receive a projection therefrom substantially as described.

3. In a mowing machine, the frame work, the shaft $b$, the means for giving the same a rotary reciprocating movement, the arm $C'$ carrying the scythe and arranged to slide through the shaft, and a stationary cam device adapted to reciprocate the arm C', said cam device being arranged adjacent to the path of the arm C' to receive a projection therefrom substantially as described.

4. In a mowing machine, the frame work, the scythe, the sliding arm C' carrying the same, the means for giving the arm with the scythe a rotary reciprocating movement, and the cam device comprising the swinging cam g, for giving the arm C' a radial reciprocating movement, substantially as described.

5. In a mowing machine, the right angular frame work comprising the crank shaft D, the series of scythes arranged along the inclined bar of the frame, and the rods E and gearing for moving the scythes, substantially as described.

In witness whereof I have hereunto set my hand in presence of two witnesses.

LUDWIG JANKOWSKI.

Witnesses:
FRIDOR LYON,
JULIUS HORER.